(12) United States Patent
Stablo et al.

(10) Patent No.: US 8,448,337 B2
(45) Date of Patent: May 28, 2013

(54) DEVICE FOR POSITIONING A PIECE OF CAR BODY WORK ON A MOTOR VEHICLE

(75) Inventors: Frederic Stablo, Porcieu Amblagnieu (FR); Sebastien Nozza, Bussurel (FR)

(73) Assignee: Compagnie Plastic Omnium, Lyons (FR)

( * ) Notice: Subject to any disclaimer, the term of this patent is extended or adjusted under 35 U.S.C. 154(b) by 689 days.

(21) Appl. No.: 12/449,486

(22) PCT Filed: Feb. 26, 2008

(86) PCT No.: PCT/FR2008/050322
§ 371 (c)(1),
(2), (4) Date: Nov. 5, 2009

(87) PCT Pub. No.: WO2008/125764
PCT Pub. Date: Oct. 23, 2008

(65) Prior Publication Data
US 2010/0052365 A1    Mar. 4, 2010

(30) Foreign Application Priority Data

Feb. 28, 2007  (FR) .................................... 07 53558

(51) Int. Cl.
*B21D 53/88*    (2006.01)
(52) U.S. Cl.
USPC .......................................... 29/897.2; 29/897

(58) Field of Classification Search
USPC ................. 29/897, 897.15, 897.2; 200/61.76, 200/302.3
See application file for complete search history.

(56) References Cited

U.S. PATENT DOCUMENTS

| 6,396,013 | B1 * | 5/2002 | Kondo ........................ 200/302.3 |
| 7,410,209 | B2 | 8/2008 | Clapie | |

FOREIGN PATENT DOCUMENTS

| DE | 102 28 464 A1 | 1/2004 |
| DE | 10 2005 013 1 B3 | 7/2006 |
| DE | 10 2006 008 216 A1 | 8/2007 |
| FR | 2 857 314 A1 | 1/2005 |

OTHER PUBLICATIONS

Chinese Office Action dated Jan. 26, 2011 from Chinese Patent Application No. 200880006546.0 (with English-language translation).

* cited by examiner

*Primary Examiner* — Richard Chang
(74) *Attorney, Agent, or Firm* — Oliff & Berridge, PLC

(57) ABSTRACT

A device for positioning a motor vehicle bodywork part, the bodywork part intended to be juxtaposed with a door of the vehicle, it being possible for the door to adopt an open position and a closed position on the vehicle. The positioning device includes elastic means capable of defining: a first position for the positioning device when the door is in the open position, and a second position for the positioning device when the door is in the closed position, during which the elastic means are deformed.

10 Claims, 2 Drawing Sheets

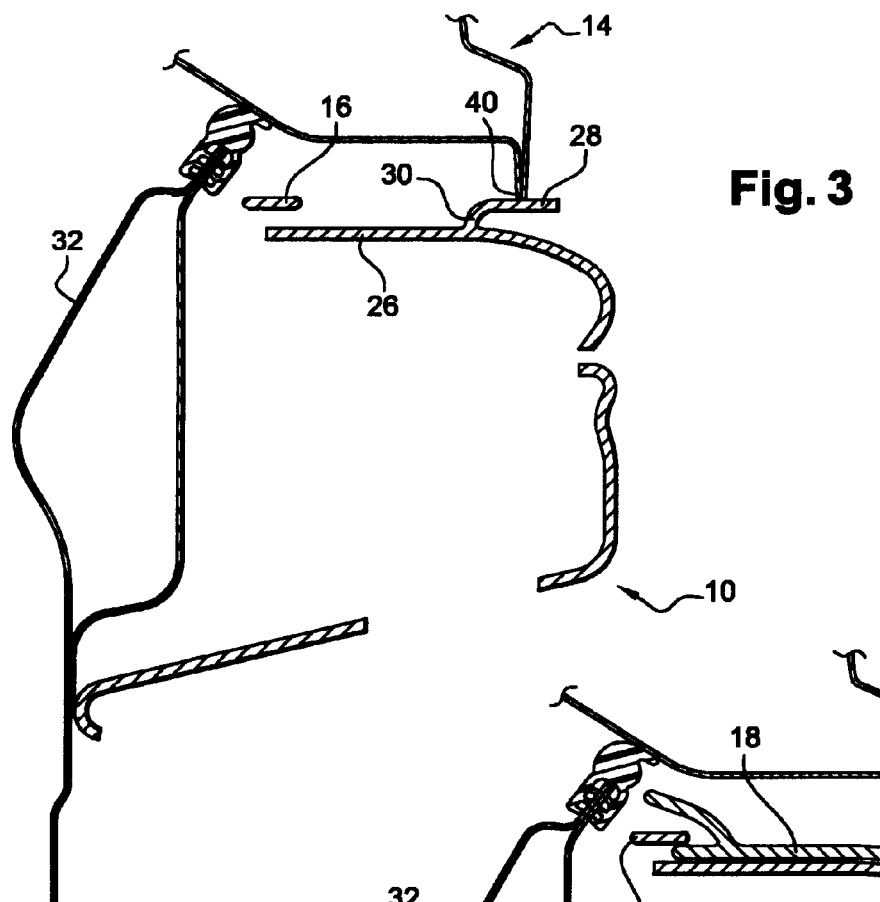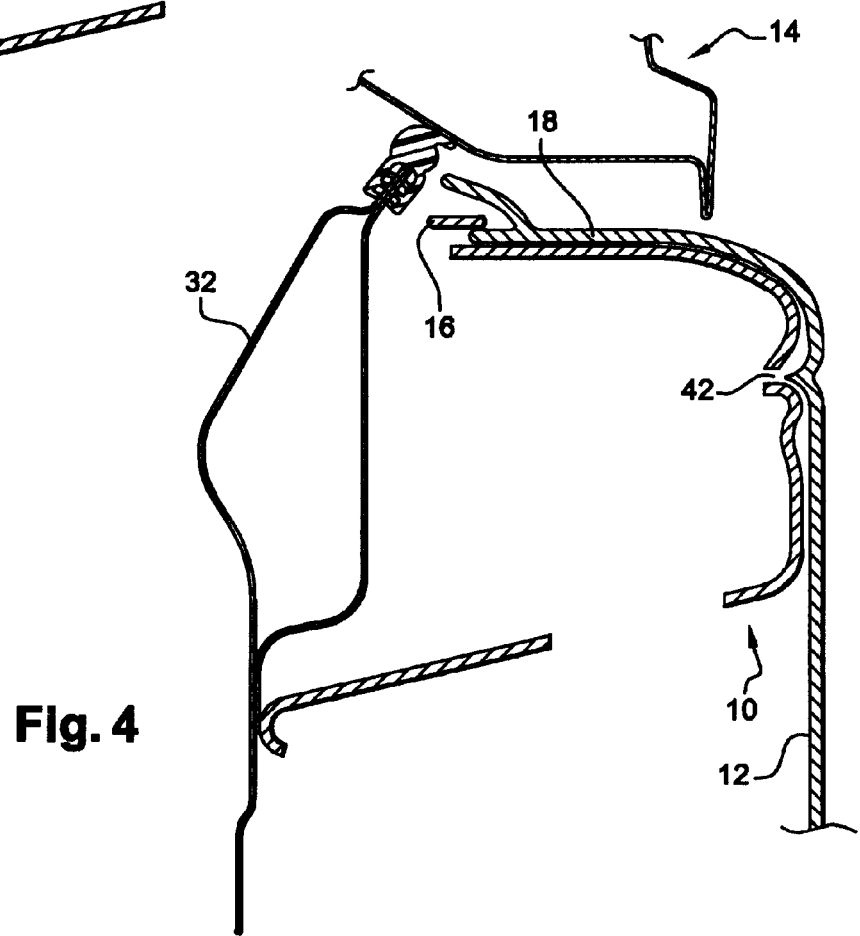

DEVICE FOR POSITIONING A PIECE OF CAR BODY WORK ON A MOTOR VEHICLE

TECHNICAL FIELD

This invention relates to a device for positioning a bodywork part on a motor vehicle.

PRIOR ART

It is already known a rear impact absorber fitted on a motor vehicle, used to position the upper surface of a rear bumper skin, this bumper skin being juxtaposed, when mounted on the vehicle, with a rear door composed of a tailgate, which can adopt an open position and a closed position on the vehicle.

When assembling the vehicle, the bumper skin and the tailgate are positioned as follows. The tailgate is first mounted on the vehicle, it is closed, an elastomer spacer is fitted along the lower edge of the tailgate, then the absorber is fitted below this spacer, pressing it against the elastomer spacer. The elastomer spacer therefore creates a certain degree of clearance between the absorber and the lower edge of the tailgate, so that the absorber can then be attached permanently to the vehicle. Once the absorber has been fastened, the elastomer spacer is removed and the bumper skin fitted on the absorber. Use of the spacer ensures that the clearance between the bumper skin and the tailgate is relatively regular.

Problem Posed by the Prior Art

Use of a spacer ensures that the rear bumper skin is correctly positioned with respect to the tailgate. Nevertheless, the time and the labour costs required to install and then remove the spacer to ensure correct positioning are relatively high.

Solution Proposed

The invention seeks to provide a device for positioning a bodywork part allowing faster positioning of the bodywork part with respect to a door.

To this end, the invention relates to a device for positioning a motor vehicle bodywork part, the bodywork part being intended to be juxtaposed with a door of the vehicle, it being possible for this door to adopt an open position and a closed position on the vehicle, characterised in that the positioning device comprises elastic means capable of defining:

- a first position for the positioning device when the door is in open position, and
- a second position for the positioning device when the door is in closed position, during which the elastic means are deformed.

Using the elastic means, a first position can be defined for the positioning device, called temporary position, when the door is in open position on the vehicle, during which the positioning device is held on the vehicle, without necessarily adopting a precise position. Then, when closing, the door may displace the device towards a second position, called permanent position, displacement being made possible by deformation of the elastic means. This permanent position of the device corresponds to a satisfactory position of the positioning device with respect to the door, and this device, and therefore the bodywork part, can then be fastened permanently to the vehicle.

Thus, when assembling the vehicle, closing the door automatically positions the positioning device and therefore, subsequently, the bodywork part.

We can see that there is no need to use an intermediate part such as a spacer to position the device and the door, thereby reducing the number of vehicle assembly operations.

Moreover, positioning of the device and the door is direct, i.e. the edge of the device and that of the door act directly against each other, such that a very small clearance can be left between the bodywork part and the door. This reduction in clearance is particularly advantageous: while clearances of approximately 4 mm (millimeters) are generally left between a bodywork part and a door, clearances of approximately 1 mm can be obtained with the automatic positioning provided by the door described above.

In addition, the clearance between the support and the door, then between the bodywork part and the door, is repeatable, i.e. identical from one vehicle to another, and regular, i.e. identical across the entire dimension of the door. In contrast, use of a spacer may create clearance repeatability and regularity difficulties. Firstly, the spacer represents an extra part with manufacturing tolerances. Secondly, the clearance formed by the spacer may vary along the length of the junction between the positioning device and the door, in particular according to the pressure exerted by the operator on the spacer when pressing the device against the door, especially since this spacer is generally made from elastomer. In addition, by using a spacer, the pressure exerted may vary from one operator to another, thereby varying the clearance from one vehicle to another, and even from one side of the vehicle to the other.

PARTICULAR EMBODIMENTS

The invention may in addition comprise one or more of the following characteristics:

- The elastic means comprise a spring blade capable of deforming in one direction, called deformation direction, perpendicular to the junction between the bodywork part and the door.
- The positioning device comprises a stop to position the device in a direction perpendicular to the deformation direction.
- The deformation direction corresponds to the vertical direction of the vehicle and the device preferably comprises stops to position the device in the longitudinal or transverse direction of the vehicle.
- The positioning device comprises means for permanently fastening the device on the vehicle, the device being in its second position.
- The positioning device comprises, on a wall intended to be juxtaposed with the door, means for leaving a space between the wall of the device and the door. These means are intended to ensure a minimum clearance between the device and the door, in particular to allow space to insert the wall of the bodywork part.
- The spacing means are retractable, in particular by using a foldable or tearable hinge film (local thinning of the material).
- The positioning device is intended to position a rear bumper skin, juxtaposed with a rear tailgate.
- The positioning device is intended to position a front bodywork part, juxtaposed with a front bonnet of the vehicle. This embodiment is especially advantageous since it guarantees correct positioning of the bonnet and a bodywork part, such that bonnet slamming stops can be planned on the bonnet or the bodywork part without the need for operations to position these stops.

The positioning device is an impact absorber. A rear impact absorber can therefore be used to support and position the bumper skin.

The positioning device is a radiator grille.

The positioning device is intended to position a side bodywork part, juxtaposed with a side door of the vehicle.

The invention also relates to an assembly of a positioning device as described above and the bodywork part. Possibly, the positioning device may be made in one piece with the bodywork part.

The invention also relates to a method for positioning a bodywork part with respect to a door of a motor vehicle, it being possible for this door to adopt an open position and a closed position, during which:

the door is mounted on the vehicle in open position;
a device for positioning the bodywork part is fitted on the vehicle in a first position;
the door is closed on the vehicle, which results in an elastic displacement of the device so that it adopts a second position;
the positioning device is fastened permanently in this second position on the vehicle,
the bodywork part is fitted on the positioning device.

DESCRIPTION OF THE FIGURES

It will be easier to understand the invention on reading the description below, given as an example and referring to the drawings, on which:

FIG. 3 is a cross-section in direction III of a positioning device similar to that of FIG. 1, fitted on the vehicle;

FIG. 4 is a cross-section similar to that of FIG. 3, the bodywork part having been fitted on the positioning device.

FIG. 1 represents a rear absorber 10, forming a positioning device for a rear bumper skin 12 (shown on FIG. 4), this skin 12 being intended to be juxtaposed with a rear tailgate 14, which can adopt an open position and a closed position on the vehicle.

Figure 1:
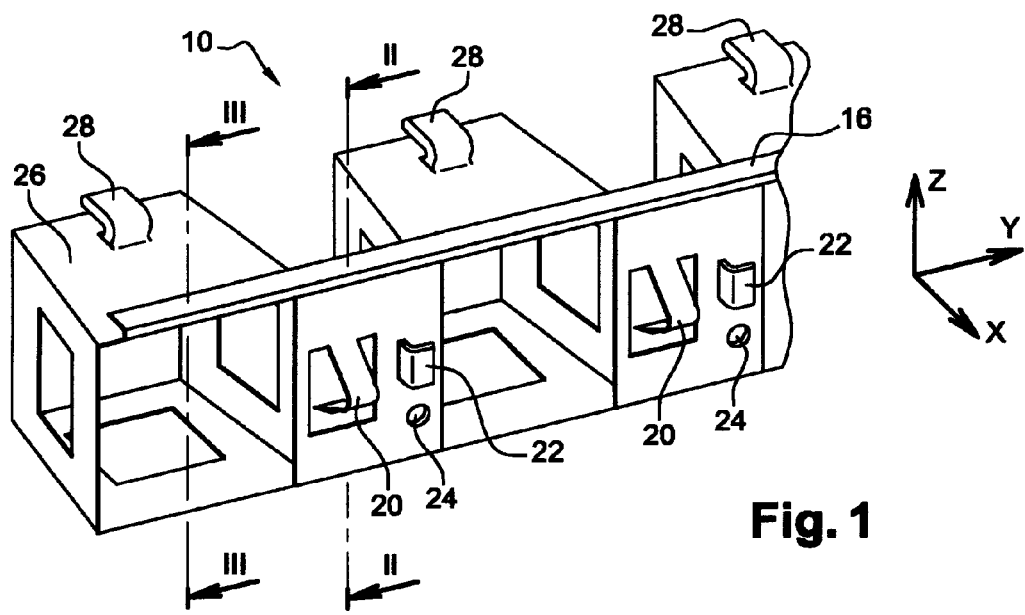
FIG. 1 is a schematic view in perspective of the front of a part of a positioning device according to the invention.

The absorber 10 comprises means 16 for positioning the upper surface 18 of the skin 12, comprising a groove extending in the transverse direction Y of the vehicle.

The absorber 10 comprises elastic means 20, composed of spring blades capable of deforming in a deformation direction, in this case the vertical direction Z, perpendicular to the junction between the bodywork part 12 and the tailgate 14, i.e. perpendicular to the transverse direction Y of the vehicle.

The absorber 10 also comprises stops 22 for positioning the absorber 10 in two directions perpendicular to the deformation direction Z, i.e. the transverse direction Y and the longitudinal direction X of the vehicle. These stops consist of hooks, shown on FIG. 1.

The absorber 10 also comprises means 24 for permanent attachment on the vehicle, such as screw holes.

The absorber 10 also comprises, on its upper wall 26 intended to be juxtaposed with the tailgate 14, spacing means 28, intended to ensure a minimum space between the upper wall 26 of the absorber and the tailgate 14, shown on FIG. 3, designed to be retractable, thanks to a hinge film 30, the means being retracted on FIG. 4.

The method for positioning the bumper skin 12 with respect to the tailgate 14 will now be described.

The tailgate 14 is first assembled on the vehicle body, in open position. The absorber 10 is then fitted on the vehicle structure, for example on a rear structure panel 32, shown on FIG. 2. The part 32 could also be a rear cross member, an impact beam or any other structural part of the vehicle.

This rear panel 32 comprises holes 34, one for each spring blade 20. The panel 32 also comprises holes (not shown) in which the hooks 22 are inserted. Thus, when the absorber 10 is fitted on the panel 32, the spring blades 20 are only slightly stressed, i.e. only slightly deformed, and rest on the upper wall 38 of the hole 34, so as to define a first position of the absorber 10, this position being temporary. The absorber 10 is therefore held in direction Z by the spring blade 20 pressing against the wall 38, in direction X by the hooks 22 which grip the wall of the panel 32, and in direction Y by the wall of the hooks 22 which extends in direction X.

Note that the absorber 10 could also be positioned in direction Y by a centring pin formed on the front wall of the absorber 10 and cooperating with a rectangular hole, extending in the deformation direction Z, cut in the panel 32.

Figure 2:
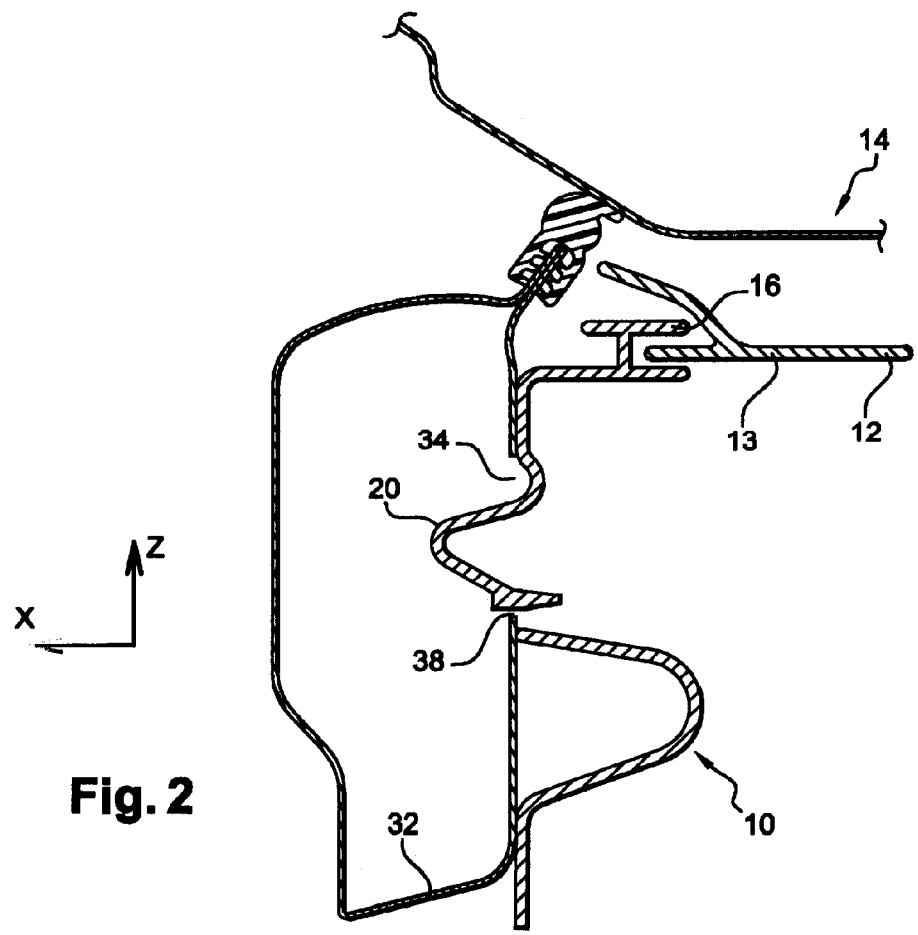
FIG. 2 is a cross-section in direction II of a positioning device similar to that of FIG. 1, fitted on the vehicle.

As can be seen, when the tailgate 14 is in open position and the absorber 10 is in temporary position, its upper wall 26 is higher than that shown on FIGS. 2 to 4, since the spring blade 20 is relaxed.

To define the second position, i.e. the permanent position, of the absorber 10, the tailgate 14 is closed. While closing, the outer lower end 40 of the tailgate cooperates with the spacing stops 28, which deforms the spring blades 20 in the deformation direction Z. The blades 20 bend, therefore allowing the absorber 10 to move downwards so as to take up its permanent position, as shown on FIG. 3.

Once in this permanent position, the absorber 10 is fastened permanently to the vehicle using the holes 24, for example with screws.

Then, to fit the bumper skin 12 on the vehicle, the tailgate 14 is opened again and the stops 28 retracted, for example by detaching them from the absorber 10. Lastly, the bumper skin 12 can be fitted and its upper surface inserted 18 in the groove 16, so that it is correctly positioned on the absorber 10, and therefore with respect to the tailgate 14. Note that the skin 12 comprises other positioning means, in particular a transverse groove 42 and means for permanent attachment.

As can be seen on FIG. 4, the clearance created between the bumper skin 12 and the tailgate 14 is particularly small.

We see that the absorber 10 is positioned automatically with respect to the tailgate when closing the tailgate 14, thereby ensuring correct positioning of the bumper skin.

Note also that the skin 12 and the tailgate 14 are correctly referenced with respect to each other, independently of the position of the structural part 32 on the vehicle. The permanent position is in fact obtained by crushing spring blades 20, which are crushed more or less depending on the height of the panel 32. Thus, even if the panel 32 is not positioned precisely on the vehicle, a minimum, regular and repeatable clearance is obtained on all vehicles fitted with the positioning device 10.

Note that the invention is not limited to the previously described embodiments.

In particular, in the example described above, the positioning device is an absorber 10, but it could be replaced by a device designed specifically for positioning, or another functional component capable of positioning a bodywork part. In particular, the positioning device may be made in one piece with the bodywork part.

In addition, this positioning device can be arranged in various parts of the vehicle in order to position a bodywork part juxtaposed with a door. For example, the positioning device can be used to position a front bodywork part, juxtaposed with a front bonnet. In particular, this positioning device may consist of a radiator grille, an inner edge of a front bumper skin, or a radiator support device, such as a technical front panel.

According to another example, the positioning device may be used to position a side bodywork part with a door.

The invention claimed is:

1. An impact absorber for a motor vehicle, comprising a device for positioning a bumper skin of the motor vehicle during assembling, the bumper skin being intended to be juxtaposed with a door of the motor vehicle, the door being capable of adopting an open position and a closed position on the motor vehicle, wherein the impact absorber further comprises elastic means capable of defining:
   a first position for the impact absorber when the door is in the open position, and
   a second position for the impact absorber when the door is in the closed position, during which the elastic means are deformed; and
   the impact absorber further comprises, on a wall intended to be juxtaposed with the door, a retractable spacing means intended to ensure a minimum clearance between the impact absorber and the door, so as to allow a space to insert a wall of the bumper skin when the impact absorber is fastened permanently to the motor vehicle in the second position.

2. The impact absorber according to claim 1, wherein the elastic means comprise a spring blade capable of deforming in a direction, called deformation direction, perpendicular to the junction between the bumper skin and the door.

3. The impact absorber according to claim 1, comprising a stop to position the device in a direction perpendicular to the deformation direction.

4. The impact absorber according to claim 2, wherein the deformation direction corresponds to the vertical direction of the vehicle and the device comprises stops to position the device in the longitudinal or transverse direction of the vehicle.

5. The impact absorber according to claim 1, comprising means for permanently fastening the device on the vehicle, the impact absorber being in the second position.

6. The impact absorber according to claim 1, wherein the spacing means is retractable by using a foldable or tearable hinge film.

7. The impact absorber according to claim 1, intended to position a rear bumper skin, juxtaposed with a tailgate of the vehicle.

8. The impact absorber according to claim 1, intended to position a front bumper skin, juxtaposed with a front bonnet of the vehicle.

9. An assembly of an impact absorber according to claim 1 and a bumper skin.

10. The assembly according to claim 9, wherein the positioning device is made in one piece with the bumper skin.

* * * * *